US008844514B2

(12) United States Patent
Steurer

(10) Patent No.: US 8,844,514 B2
(45) Date of Patent: Sep. 30, 2014

(54) LATCHING SYSTEM FOR AN APPLIANCE

(75) Inventor: Brian Steurer, Louisville, KY (US)

(73) Assignee: General Electric Company, Schenectady, NY (US)

( * ) Notice: Subject to any disclaimer, the term of this patent is extended or adjusted under 35 U.S.C. 154(b) by 698 days.

(21) Appl. No.: 12/841,505

(22) Filed: Jul. 22, 2010

(65) Prior Publication Data

US 2012/0019112 A1 Jan. 26, 2012

(51) Int. Cl.

| | |
|---|---|
| ***E05C 7/00*** | (2006.01) |
| ***E05B 47/02*** | (2006.01) |
| ***E05C 5/00*** | (2006.01) |
| ***E05B 65/00*** | (2006.01) |
| ***F24C 15/02*** | (2006.01) |
| ***E05C 1/06*** | (2006.01) |
| *A47J 37/06* | (2006.01) |
| *E05B 53/00* | (2006.01) |
| *E05B 17/00* | (2006.01) |
| *E05B 47/00* | (2006.01) |

(52) U.S. Cl.

CPC ............... *E05B 47/02* (2013.01); *E05B 53/003* (2013.01); *E05B 17/0025* (2013.01); *E05C 5/00* (2013.01); *E05B 65/0003* (2013.01); *F24C 15/022* (2013.01); *E05B 47/0012* (2013.01); *E05C 1/06* (2013.01)

USPC ........ 126/197; 126/273 R; 219/394; 219/413; 292/201; 292/109

(58) Field of Classification Search

CPC ........... E05C 1/06; E05C 5/00; E05B 53/003; E05B 65/0003; E05B 47/0012

USPC ............ 126/39 R, 191, 197, 273 R; 292/261, 292/DIG. 66, DIG. 69, 2–251, 262–278, 292/300–304, 332–336, 336.3, DIG. 12, 292/DIG. 17, DIG. 18, DIG. 21, DIG. 30; 219/394, 413; 200/61.64; 16/366; 70/442

See application file for complete search history.

(56) References Cited

U.S. PATENT DOCUMENTS

| | | | | | |
|---|---|---|---|---|---|
| 1,371,482 | A | * | 3/1921 | Hauserman et al. | 49/395 |
| 1,955,525 | A | * | 4/1934 | Bales | 292/33 |
| 2,543,643 | A | * | 2/1951 | Ryan et al. | 312/218 |
| 2,569,670 | A | | 10/1951 | Hollerith | |
| 3,033,634 | A | * | 5/1962 | Ribbens et al. | 312/219 |
| 3,125,365 | A | * | 3/1964 | Eigelbach | 292/7 |
| 3,406,677 | A | | 10/1968 | Anderson | |
| 3,438,666 | A | * | 4/1969 | Erickson | 292/210 |
| 3,469,568 | A | * | 9/1969 | Morris et al. | 126/39 R |

(Continued)

*Primary Examiner* — Avinash Savani
*Assistant Examiner* — Martha Becton
(74) *Attorney, Agent, or Firm* — Global Patent Operation; Douglas D. Zhang

(57) ABSTRACT

A latching system for an appliance is disclosed. The appliance includes a first oven, a first door for the first oven, a second oven and a second door for the second oven. The latching system includes a master latch assembly for locking the first door when it is fully closed; a slave latch assembly for locking the second door when it is fully closed; a cable operatively coupling the two latch assemblies so that a movement of one latch assembly between an unlocking position and a locking position generates a corresponding movement of the other latch assembly between an unlocking position and a locking position; a position switch for one latch assembly; and a controller configured to enable an operation of the first oven and/or the second oven when the position switch detects the latch assembly is in its locking position in conjunction with an operation request.

13 Claims, 8 Drawing Sheets

(56) References Cited

U.S. PATENT DOCUMENTS

| | | | | | |
|---|---|---|---|---|---|
| 3,498,285 | A | * | 3/1970 | McArthur, Jr. et al. | 126/197 |
| 3,610,883 | A | | 10/1971 | Holtkamp | |
| 3,625,197 | A | | 12/1971 | Pirker | |
| RE27,291 | E | * | 2/1972 | Fowler | 292/113 |
| 3,894,214 | A | | 7/1975 | Staples | |
| 3,968,983 | A | * | 7/1976 | Heit et al. | 292/201 |
| 4,013,312 | A | | 3/1977 | DeWeese | |
| 4,036,040 | A | * | 7/1977 | Graizzaffi | 70/431 |
| 4,163,443 | A | * | 8/1979 | Peterson | 126/197 |
| 4,316,079 | A | * | 2/1982 | Schmitz | 219/413 |
| 4,345,144 | A | * | 8/1982 | Bergquist | 219/413 |
| 4,351,288 | A | * | 9/1982 | Gasloli | 126/197 |
| 4,526,057 | A | * | 7/1985 | Mochida et al. | 74/502.2 |
| 4,554,907 | A | | 11/1985 | Overley | |
| 4,593,945 | A | * | 6/1986 | Arute et al. | 292/201 |
| 4,763,937 | A | * | 8/1988 | Sittnick et al. | 292/251.5 |
| 4,796,600 | A | * | 1/1989 | Hurley et al. | 126/273 A |
| 4,862,870 | A | * | 9/1989 | Fox | 126/197 |
| 4,872,284 | A | * | 10/1989 | Bentley | 49/16 |
| 4,960,297 | A | * | 10/1990 | Bouse et al. | 292/223 |
| 4,986,098 | A | * | 1/1991 | Fisher | 70/262 |
| 5,004,276 | A | | 4/1991 | Hanley | |
| 5,220,153 | A | | 6/1993 | Malone | |
| 5,419,305 | A | * | 5/1995 | Hanley | 126/197 |
| 5,509,233 | A | * | 4/1996 | Peterson | 49/139 |
| 5,639,129 | A | * | 6/1997 | Lindley | 292/145 |
| 5,670,025 | A | * | 9/1997 | Baird | 202/248 |
| 5,820,234 | A | * | 10/1998 | Capwell et al. | 312/216 |
| 6,050,117 | A | * | 4/2000 | Weyerstall | 70/277 |
| 6,302,098 | B1 | | 10/2001 | Smith | |
| 6,374,649 | B1 | * | 4/2002 | Holcomb et al. | 70/78 |
| 6,601,882 | B1 | | 8/2003 | Cole | |
| 7,225,804 | B2 | * | 6/2007 | Simmons et al. | 126/197 |
| 2002/0162369 | A1 | * | 11/2002 | Lurie et al. | 70/256 |
| 2004/0195845 | A1 | * | 10/2004 | Chevalier | 292/201 |

* cited by examiner

LATCHING SYSTEM FOR AN APPLIANCE

BACKGROUND OF THE INVENTION

The present disclosure generally relates to appliances, and more particularly to locking multiple doors of a multiple-cavity oven with a single manual latch.

Self-cleaning or pyrolitic ovens operate in the self-cleaning mode at temperatures that can in some cases exceed 800 degrees Fahrenheit. Safety regulations and standards require that the doors to a self-cleaning oven be securely locked when the temperature of the oven reaches approximately 600 degrees Fahrenheit. For example, as the temperature of the oven approaches 600 degrees Fahrenheit, a bi-metal, hydraulic, or other temperature based mechanical locking system engages a locking pin that prevents the mechanical mechanism from being unlocked. The oven doors cannot be opened until the oven temperature drops below a pre-determined temperature or set point.

Existing door locking systems for self-cleaning ovens generally fall into two groups, mechanical and electronic. Mechanical systems will incorporate an actuating mechanism that locks the door when manually activated. Typically, these manual systems are configured so that the locking position cannot be achieved unless the door is fully closed. If the locking position is not achieved, the self-cleaning cycle of the oven will not activate. A switch or other position sensing mechanism is generally used to verify that the oven door is in the fully closed position and locked.

Electronic systems will typically sense oven temperature using a resistance temperature detector (RTD) device. The electronic control system will generally have a single digit RPM motor or solenoid that will lock the oven door with an eccentrically driven locking mechanism, also referred to herein as a “latch pawl.”

When multiple ovens are in use, in a multi-cavity oven appliance, it is common to allow only one of the ovens to be in the self-clean mode or state at any one time, due to the extreme heat that is generated and the high power requirements of the oven while in the self-clean mode. However, because the adjacent oven in a multiple oven configuration can also become quite hot while the other oven is in the self-clean mode, typically all of the oven doors must be closed and locked when any one of the ovens is in the self-clean mode. In the typical double oven configuration, electronic locking systems are used because the oven that is not in the self-clean mode does not get hot enough to engage the thermally activated locking pin or switch of the mechanical system.

Electronic locking systems for multiple oven configurations will require an electronic control system that must monitor the open and closed positions of the oven door(s), verify that the door(s) are in the closed and locked positions, and drive the motor or solenoid. These electronic systems also require software and multiple position switches and sensors, and are more costly than simple mechanical systems.

Accordingly, it would be desirable to provide a system that addresses at least some of the problems identified above.

BRIEF DESCRIPTION OF THE INVENTION

As described herein, the exemplary embodiments overcome one or more of the above or other disadvantages known in the art.

One aspect of the exemplary embodiments relates to a latching system for an appliance. The appliance includes at least a first oven, a first door for the first oven, a second oven and a second door for the second oven. The latching system includes a master latch assembly for locking the first door when the first door is fully closed; a slave latch assembly for locking the second door when the second door is fully closed; a cable operatively coupling the master latch assembly and the slave latch assembly so that a movement of the master latch assembly between an unlocking position where the first door is unlocked and a locking position where the first door is locked generates a corresponding movement of the slave latch assembly between an unlocking position where the second door is unlocked and a locking position where the second door is locked; a position switch associated with one of the master latch assembly and the slave latch assembly and configured to detect when the one of the master latch assembly and the slave latch assembly is in its locking position; and a controller coupled to the position switch and configured to enable an operational mode of at least one of the first oven and the second oven when the position switch detects the one of the master latch assembly and the slave latch assembly is in its locking position in conjunction with a request for the operational mode.

Another aspect of the disclosed embodiments relates to an appliance including a first oven; a first door for the first oven; a second oven; a second door for the second oven; a master latch assembly for locking the first door when the first door is fully closed; a slave latch assembly for locking the second door when the second door is fully closed; a cable operatively coupling the master latch assembly and the slave latch assembly so that a movement of the master latch assembly between an unlocking position where the first door is unlocked and a locking position where the first door is locked generates a corresponding movement of the slave latch assembly between an unlocking position where the second door is unlocked and a locking position where the second door is locked; a position switch associated with one of the master latch assembly and the slave latch assembly and configured to detect when the one of the master latch assembly and the slave latch assembly is in its locking position; and a controller coupled to the position switch and configured to enable an operational mode of at least one of the first oven and the second oven when the position switch detects the one of the master latch assembly and the slave latch assembly is in its locking position in conjunction with a request for the operational mode.

Yet another aspect of the disclosed embodiments relates to a method of operating an appliance having at least a first oven, a first door for the first oven, a second oven and a second door for the second oven. The method includes locking the first door and the second door after the first door and the second door are fully closed, the first door being locked by a first latch assembly, the second door being locked by a second latch assembly, the first latch assembly and the second latch assembly being linked together by a cable so that a movement of the first latch assembly between an unlocking position where the first door is unlocked and a locking position where the first door is locked generates a corresponding movement of the second latch assembly between an unlocking position where the second door is unlocked and a locking position where the second door is locked; detecting a locking position of one of the first latch assembly and the second latch assembly; and enabling an operational mode of at least one of the first oven and the second oven when the one of the first latch assembly and the second latch assembly is in its locking position in conjunction with a request for the operational mode.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE DISCLOSURE

Figure 1:
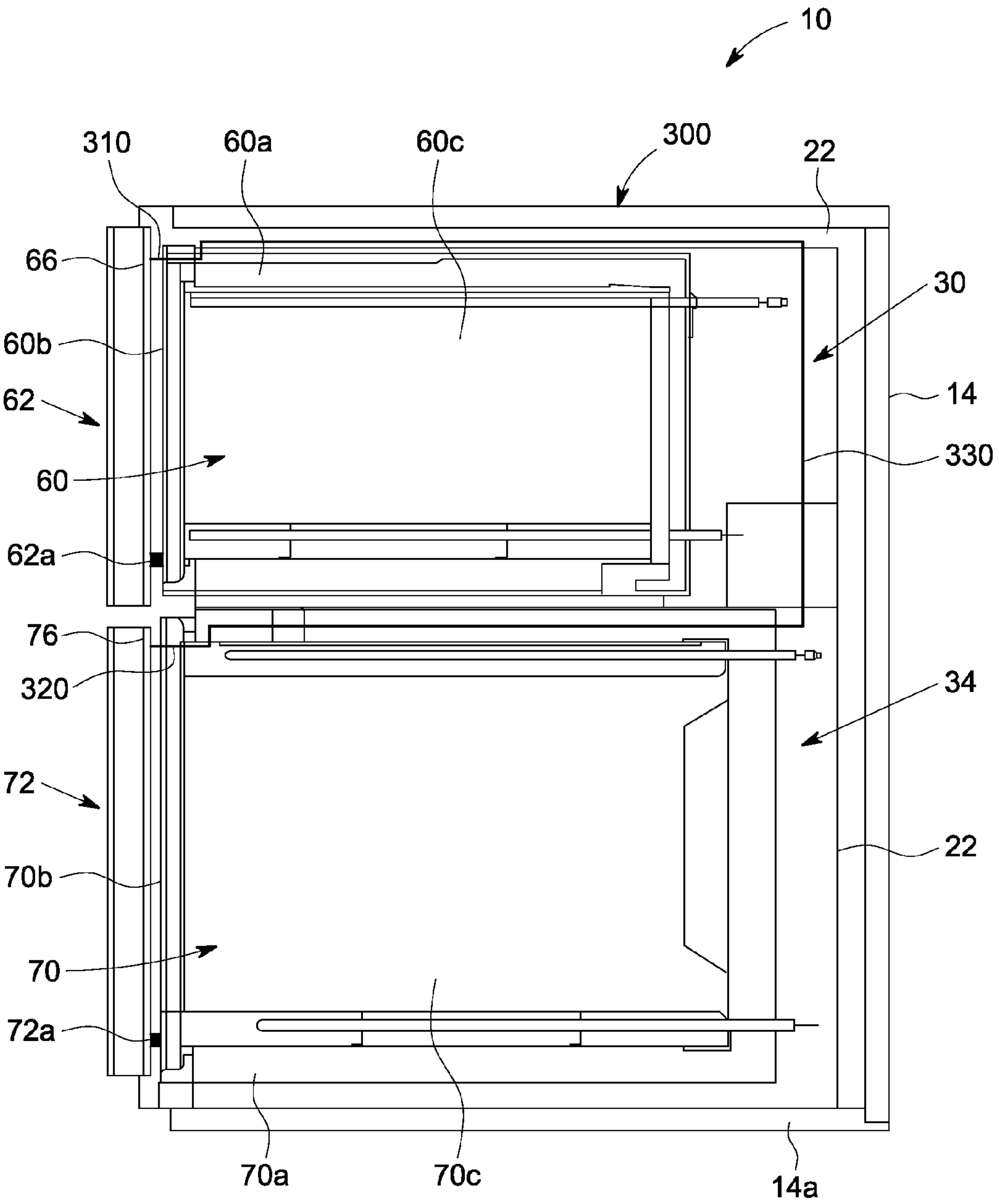
FIG. 1 is a perspective view of an exemplary dual-cavity oven incorporating aspects of the disclosed embodiments.

Referring to FIG. 1, an exemplary appliance such as a dual-cavity oven in accordance with the aspects of the disclosed embodiments is generally designated by reference numeral 10. The aspects of the disclosed embodiments utilize a mechanical cable to allow communication between separate mechanical latching systems in a multi-cavity, or multiple oven appliance. For purposes of the description herein, the appliance is described as a dual-cavity or double oven appliance. In one embodiment, a driving or master latch is coupled to a similar sensing or slave latch by a cable. When the drive latch is activated, the cable will move the sensing latch a corresponding distance. Each latch cannot move to the fully locked position unless the respective oven door of the multiple-cavity oven is in the fully closed position. The latch assemblies can each include a position switch and a thermally driven locking mechanism that prevents either latch from being opened as long as the temperature is above a predetermined temperature set point. Once the set point drops below the predetermined temperature in each oven, both thermal-locking mechanisms will be disengaged and the master latch can be moved to the unlocked position. Movement of the master latch to the unlocked position will move the slave latch to the unlocked position.

In FIG. 1, the oven 10 is disposed in a recess defined by a wall section 14. The oven 10 sits on the bottom 14*a* of the wall section 14. The oven 10 includes a housing 22 that defines first and second cavities 30, 34 therein.

An upper, first oven unit 60 is disposed or positioned in the first cavity 30. The first oven unit 60 includes a first oven chamber 60*a* having a first frontal opening 60*b*. The first oven unit 60 also includes a first oven 60*c* disposed in the first oven chamber 60*a*, and a first oven door 62 for selectively closing the first frontal opening 60*b* of the first oven chamber 60*a*. The first oven door 62 can be rotatably attached to the first oven chamber 60*a* or the housing 22 at the hinge point 62*a*.

Similarly, a lower, second oven unit 70 is positioned in the second cavity 34. The second oven unit 70 includes a second oven chamber 70*a* having a second frontal opening 70*b*. The second oven unit 70 also includes a second oven 70*c* disposed in the second oven chamber 70*a*, and a second oven door 72 for selectively closing the second frontal opening 70*b* of the second oven chamber 70*a*. The second oven door 72 can be rotatably attached to the second oven chamber 70*a* or the housing 22 at the hinge point 72*a*.

The oven 10 includes a latch or latching system 300 that includes a master latch assembly 310 and a slave latch assembly 320. The master latch assembly 310 and the slave latch assembly 320 are coupled together by a cable 330, also referred to as a throttle cable. In alternate embodiments, any suitable mechanical coupling mechanism can be used to translate articulation of the master latch assembly 310 to the slave latch assembly 320. Movement of the master latch assembly 310 between the open and locked position will cause a corresponding movement of the slave latch assembly 320 between an opened and locked position by reason of the cable 330.

The latch assemblies 310 and 320 are generally configured to mechanically lock doors 62 and 72, respectively, using a single mechanical control. The doors 62 and 72 will not unlock unless both ovens 60 and 70 meet certain pre-determined temperature set points after a cleaning operation, such as for example a pyrolitic self-cleaning operation or cycle.

Figure 2:
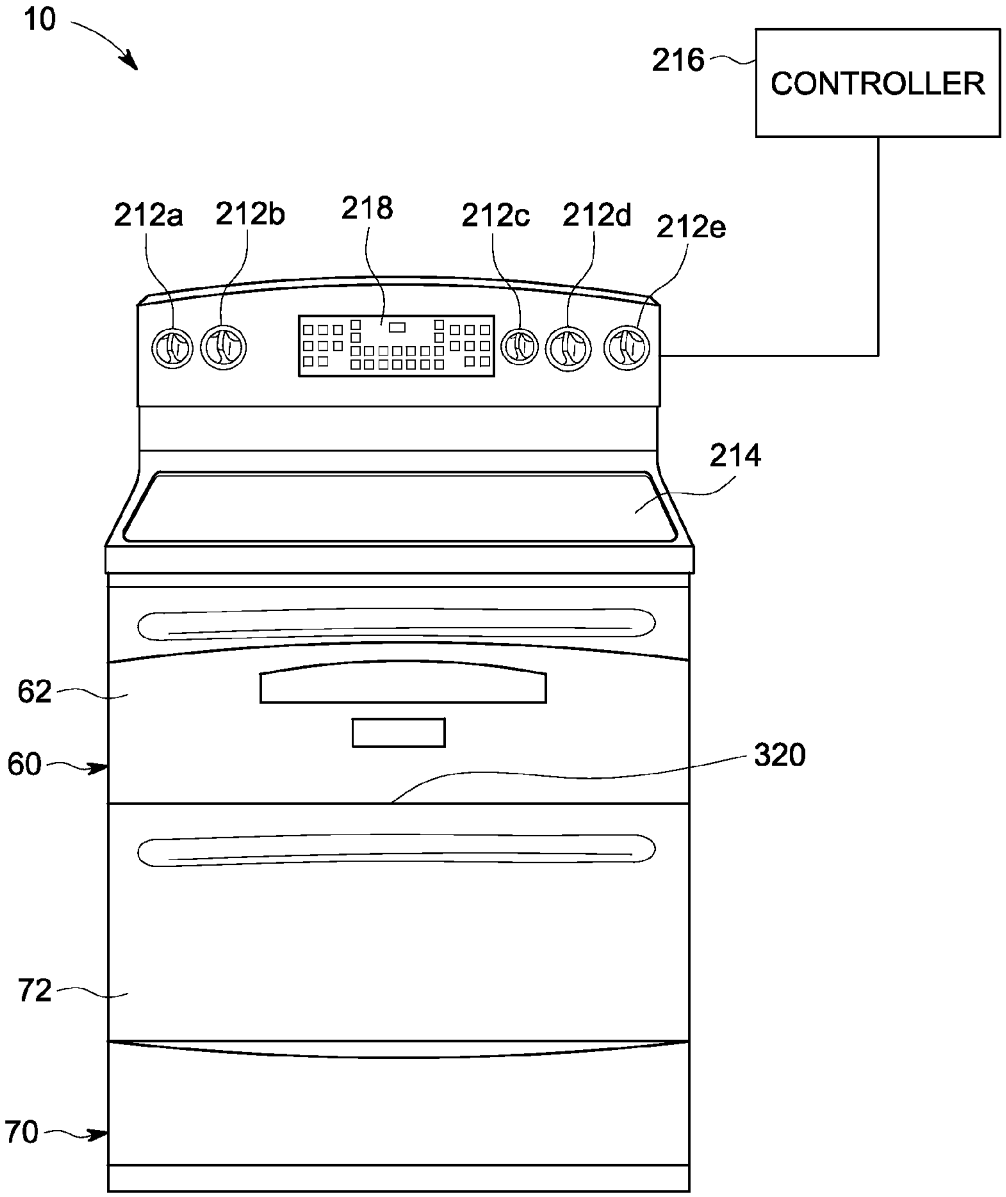
FIG. 2 is a front view of one embodiment of the dual-cavity oven of FIG. 1.

FIG. 2 is a front perspective view of the oven 10 of FIG. 1. In this embodiment, the oven 10 includes a display or user interface 218 and controls 212*a*-212*e* for operating elements of the oven 10, such as the surface heating units, generally referred to as 214, as well as the ovens 60 and 70. In alternate embodiments, any suitable multiple oven configuration can be used. The master latch assembly 310 of the latching system 300 shown in FIG. 1 is associated with the first oven unit 60, while the slave latch assembly 320 shown in FIG. 1 is associated with the second oven unit 70. In this example, the master latch assembly 310 includes a handle member 311 that can be used to move the master latch assembly 310 between an open and locked position.

In the example shown in FIG. 2, a portion of handle member 311 of the master latch assembly 310 may be visible when the oven door 62 is closed. In accordance with the aspects of the disclosed embodiments, the second oven unit 70 includes the slave latch assembly 320 that is generally not visible to the user when the oven door 72 is closed. Although the master latch assembly 310 and slave latch assembly 320 are described herein with respect to the first oven unit 60 and the second oven unit 70, the aspects of the disclosed embodiments are not so limited, and in alternate embodiments master latch assembly 310 could be associated with the second oven unit 70, while the slave latch assembly 320 can be associated with the first oven unit 60.

Figure 3:
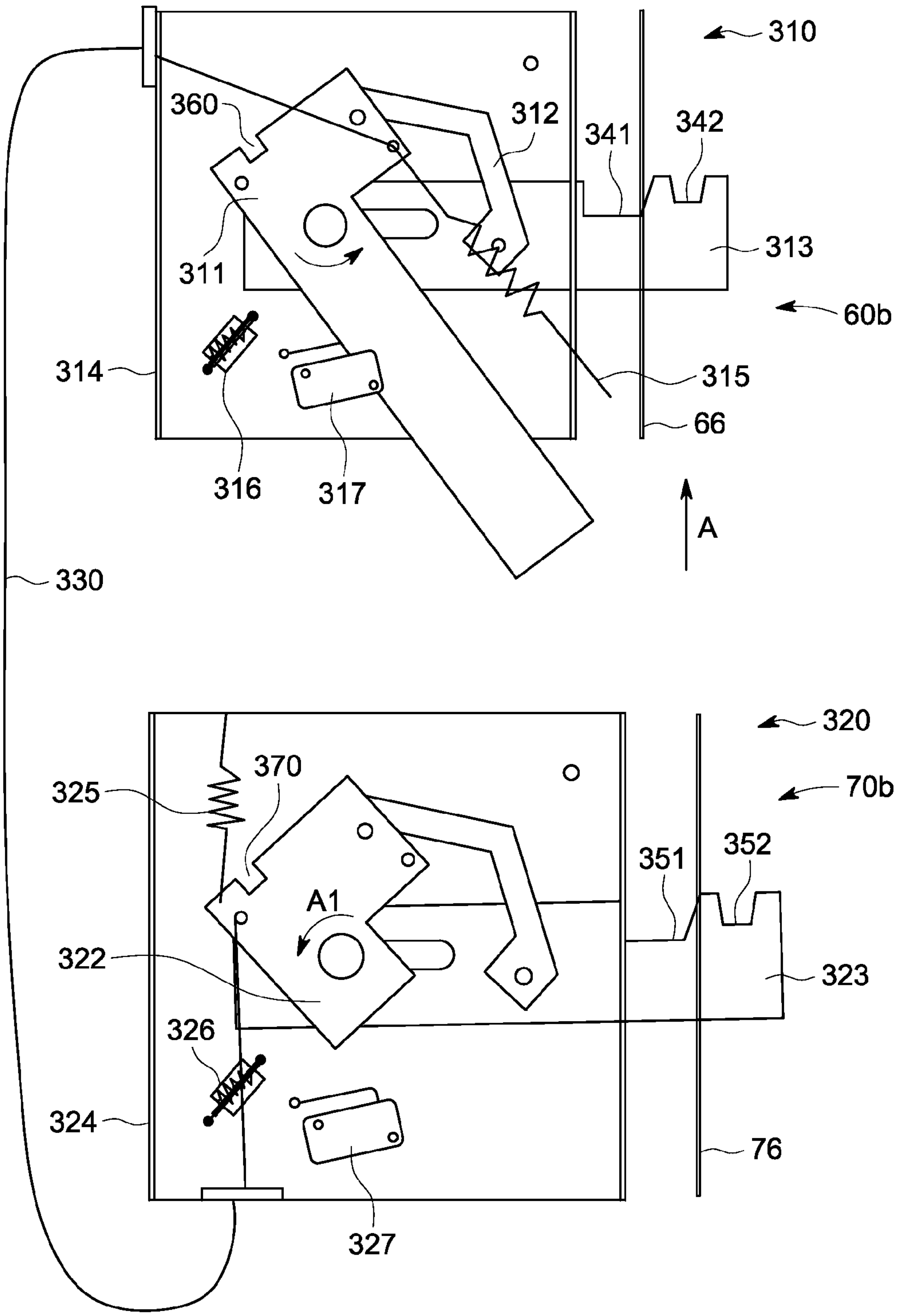
FIG. 3 is a top-down schematic view of a latching assembly incorporating aspects of the disclosed embodiments in an open position.

FIG. 3 illustrates a top-down view of one embodiment of the latching system 300 incorporating aspects of the disclosed embodiments. As shown in FIG. 3, the latching system 300 generally includes master latch assembly 310 and slave latch assembly 320. A cable 330 operatively couples the master latch assembly 310 and the slave latch assembly 320.

The master latch assembly 310 generally includes the handle member 311, a master link member 312 and a latch pawl 313. In one embodiment, the handle member 311 and master link member 312 comprises a single, integrated member. The latch pawl 313 is configured to engage a portion of the door liner 66 of the oven 10 when the handle member 311 is moved in direction A, into the locked position.

Figure 4:
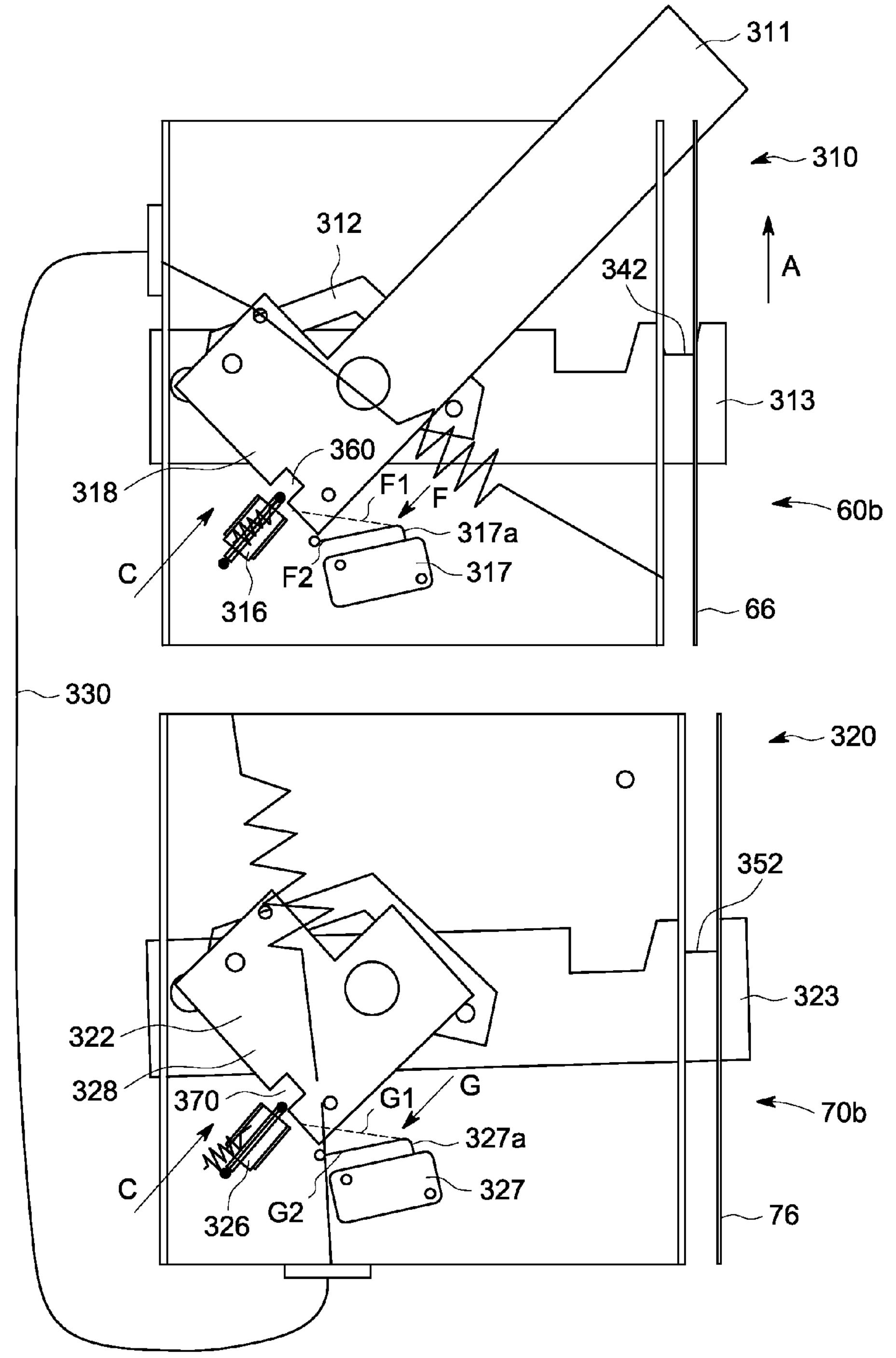
FIG. 4 is a top-down schematic view of a latching assembly incorporating aspects of the disclosed embodiments in a closed position.

The slave latch assembly 320 is generally configured in a manner similar to that of the master latch assembly 310. In one embodiment, the slave latch assembly 320 includes a slave link member 322 and a latch pawl 323. In accordance with the aspects of the disclosed embodiments, when the handle member 311 is moved in the direction A towards the locked position, the cable 330 causes the slave latch 320 to move a distance corresponding to the movement of the handle member 311. As the master latch assembly 310 drives the latch pawl 313 into the locked position, as shown in FIG. 4, the cable 330 will attempt to move the slave latch assembly 320 a corresponding distance by rotating the slave link member 322 in direction A1 illustrated in FIG. 3, and moving the latch pawl 323 into the locked position. The latch pawl 323 of the slave latch assembly 320 is configured to engage a portion of the door liner 76 of the oven 10 in the locked position. In order for both latch pawls 313 and 323 to fully engage the respective door liners and move to their respective locked positions, each respective door, 62, 72, must be in the fully closed position.

In one embodiment, the master latch assembly 310 also includes a base plate 314, return spring 315, a temperature-based or dependent locking mechanism or device 316, and a switch 317. The slave latch assembly 320 includes similar components. The base plates 314, 324 generally serve as the mounting structure for the components of the master latch assembly 310 and slave latch assembly 320, and are also used to secure the master latch assembly 310 and slave latch assembly 320 to the respective portions of the housing 22 or other frame member of the oven 10 in a suitable manner.

The temperature-based locking mechanisms 316, 326 can comprise any suitable temperature-based locking mechanism, such as the bi-metal switch referred to earlier for example, or other mechanical thermostat. The temperature-based locking mechanisms 316, 326 are configured to engage a locking mode or position when a pre-determined temperature set point is reached. Generally, this is approximately 600 degrees Fahrenheit in conjunction with a self-cleaning mode, although any suitable temperature set point can be used.

The switches 317, 327 can comprise any suitable switch type, such as a normally open micro-switch for example, that are generally configured to detect when the respective master and slave latches 310, 320 are in a closed and locked position. In accordance with the aspects of the disclosed embodiments, if either switch 317 or 327 is not in a closed and locked position, the self-cleaning mode of the oven 10 cannot be activated.

The return springs 315, 325 are generally configured to retain or urge the respective latch assemblies 310, 320 into the open position when the latch assemblies 310, 320 are not in the closed and locked position.

FIG. 3 illustrates an example of a master latch assembly 310 in the open and unlocked position. As shown in FIG. 3, the latch pawl 313 includes two notches 341, 342. In order for the master latch assembly 310 to engage the closed and locked position, the notch 342 must engage door liner 66. Notch 341 is configured to engage the door liner 66 when door 62 is not fully closed, and prevent the master latch assembly 310 from engaging the closed and locked position. The latch pawl 323 of the slave latch assembly 320 includes similarly configured notches 351, 352.

FIG. 4 illustrates an example where each of the master latch assembly 310 and the slave latch assembly 320 are in a closed and locked position. In this embodiment, the handle member 311 has been moved in the direction A until notch 342 of the latch pawl 313 engages the door liner member 66 of oven door 62. Notch 352 of latch pawl 323 engages door liner member 76. End 318 of the handle member 311 contacts the switch 317, which causes the switch 317 to communicate the closed and locked position, while end 328 of the slave link member 322 contacts the switch 327. In this example, the switches 317, 327 are micro-switches that include respective actuator members 317*a*, 327*a*. When the end 318 of the handle member 311 engages the switch 317, the actuator member 317*a* moves in the direction F, from position F1 to position F2, where position F2 is indicative of the closed and locked position of the oven door 62. When the slave link 322 engages the switch 327, the actuator member 327*a* moves in the direction G, from position G1 to position G2, where position G2 is indicative of the closed and locked position of the oven door 72.

Referring again to FIG. 3, the configuration and operation of the notches 351 and 352 in the slave latch 320 is generally the same as that described above with respect to the master latch assembly 310. If the oven door 72 is not in the fully closed position, notch 351 will engage a portion of the door liner member 76, which prevents the oven door 72 from fully locking. The slave link 322 will not contact or engage the switch 327. When the oven door is fully closed, notch 352 engages the door liner member 76 as illustrated in FIG. 4. The slave link 322 makes contact with or engages the switch 327 to indicate that the oven door 76 is in the fully closed and locked position.

Figure 5:
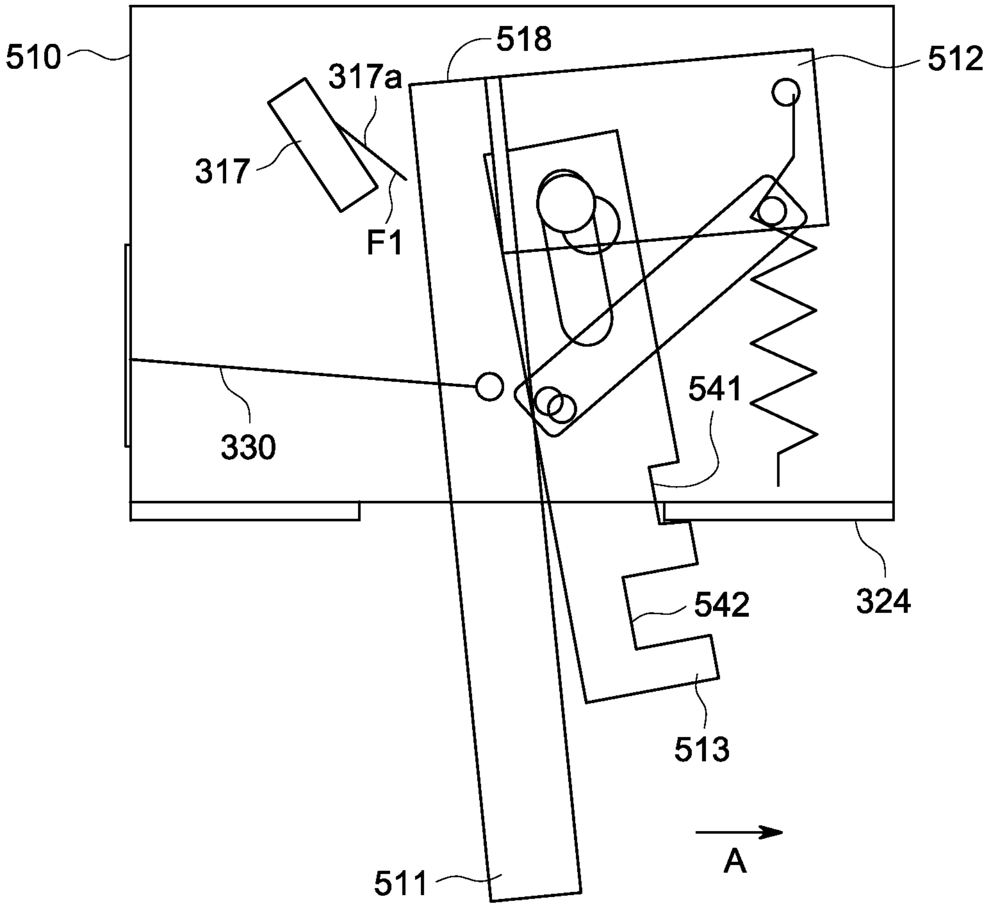
FIGS. 5 and 6 are top-down schematic views of one embodiment of a latching assembly incorporating aspects of the disclosed embodiments.

FIG. 5 illustrates another embodiment of a master latch assembly 510. In this embodiment, the master latch assembly 510 is not in the fully closed position and the corresponding oven door 62 cannot be locked in order to activate the self-cleaning mode. A shown in FIG. 5, the latch pawl 513 of the master latch assembly 510 includes the notch 541. The notch 541 is in engagement with the base plate member 324. The engagement of the notch 541 with the base plate member 324 prevents the handle member 511 from moving further in the direction A to the fully locked position. The fully locked position in this example would require the engagement of notch 542 with the door liner member 66. Since the handle member 511 does not travel in direction A to the fully locked position, the end 518 of the master link 512 does not make contact with or activate the actuator 317a of the switch 317, and the switch 317 remains in the in-active or normal position F1.

When the latching assembly 300 is in the fully closed position, as is illustrated in FIG. 4, the temperature-dependent locking mechanisms 316 and 326 are configured to lock each of the respective latch assemblies 310, 320 in the closed position once the temperature of the respective oven reaches or exceeds the pre-determined temperature set point. In the embodiments shown in FIGS. 3 and 4, each link assembly 312, 322, includes a notch, referenced as 360 and 370 respectively. Each notch 360, 370 is configured to receive or engage the respective temperature-dependent locking mechanism 316, 326, when the mechanisms 316, 326 are activated.

In the example shown in FIG. 4, as the temperature of the first and second oven chambers 60*a* and 70*a* increase during the self-cleaning cycle to a pre-determined set point, such as for example 600 degrees Fahrenheit, the respective temperature-dependent locking mechanisms 316, 326 will activate. When the temperature-dependent locking mechanism 316, 326 is a bi-metal pin or screw, the pin or screw will move in the direction C when the respective oven temperature reaches the pre-determined temperature set point. As long as the oven temperature remains at or above the pre-determined temperature set point, the respective temperature-dependent locking mechanism 316, 326 remains in the activated and engaged position. For example, the locking mechanism 326 will remain in the locked or activated position until the temperature of the oven chamber 70*a* cools to a pre-determined temperature set point. As long as the slave latch assembly 320 remains in this locked position, the master latch assembly 310 will also remain locked, as the cable 330 will be retained in the locked position. When one of the temperature-dependent locking mechanisms 316, 326 is activated and engaged, each latch assembly 310, 320 will remain locked, or prevented from being unlocked.

Figure 6:
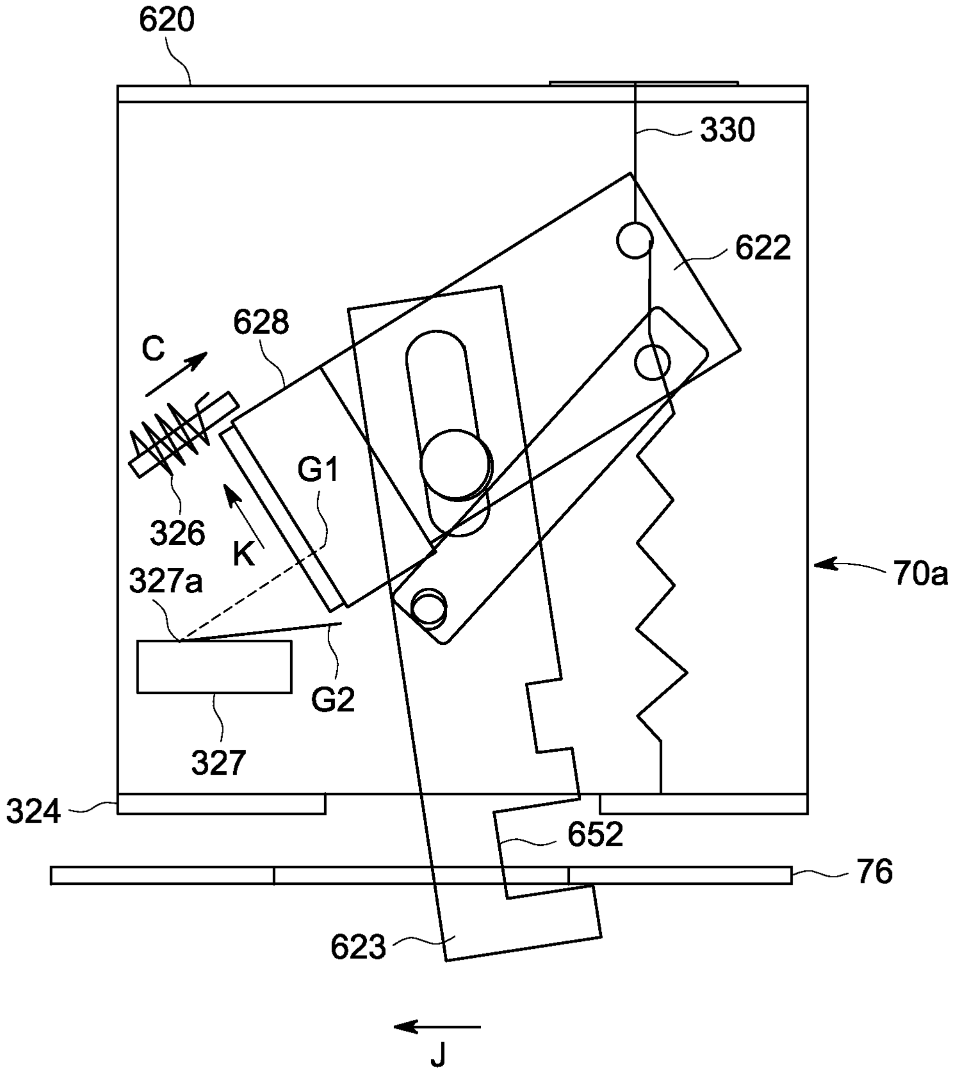

FIG. 6 generally illustrates another embodiment of a slave latching assembly 620. In this embodiment, the slave latching assembly 620 does not include a notch into which the temperature-dependent locking mechanism 326 is received. Rather, in the activated mode, the temperature dependent locking mechanism 326 extends in the direction C, and is configured to engage a portion of the end 628 of the slave link member 622, if the slave link member 622 moves in the direction K. In a situation where the slave latching assembly 620 is attempted to be unlocked while the temperature-dependent locking mechanism 326 is in the activated position, movement of the slave link member 622 is blocked.

As shown in the example of FIG. 6, the notch 652 of the latch pawl 623 of the latching assembly 620 is in at least partial engagement with the door liner member 76. As the latch pawl 623 moves in the direction J away from the fully locked position, the end 628 of the slave link member 622 is caused to move in the direction K. As the end 628 of the slave link member 622 moves in the direction K, it will engage the temperature-dependent locking mechanism 326. The engagement of the end 628 of slave link member 622 with temperature-dependent locking mechanism 326 prevents further movement of the latch pawl 623 and slave link member 622. This prevents the door 72 from being unlocked. Any movement of actuator 327*a* of switch 327 from position G2, as the slave link member 622 moves in direction K in this example, is not sufficient in this embodiment to de-activate switch 327, or return the actuator to position G1.

Although the exemplary embodiments described herein show the use of a temperature-dependent locking mechanism with both the master and slave latching assemblies, in one embodiment, only one of the latching assemblies needs to have a temperature-dependent locking mechanism associated therewith. For example, in the embodiment shown in FIGS. 5 and 6, the master latching assembly 510 does not include a temperature-dependent locking mechanism. The cable interconnection 330 between the two latching assemblies 510 and 620 will not permit movement of one latching assembly without a corresponding movement in the other assembly. Thus, as is described herein, if one of the oven doors 62, 72, is secured by a respective temperature-dependent locking mechanism 316, 326, the other door 62, 72 cannot be unlatched or unlocked. Referring to the embodiments shown in FIGS. 3 and 4, in order for either one of the latching assemblies 310, 320 to be unlatched, both temperature-dependent locking mechanisms 316, 326 must be disengaged.

Figure 7:
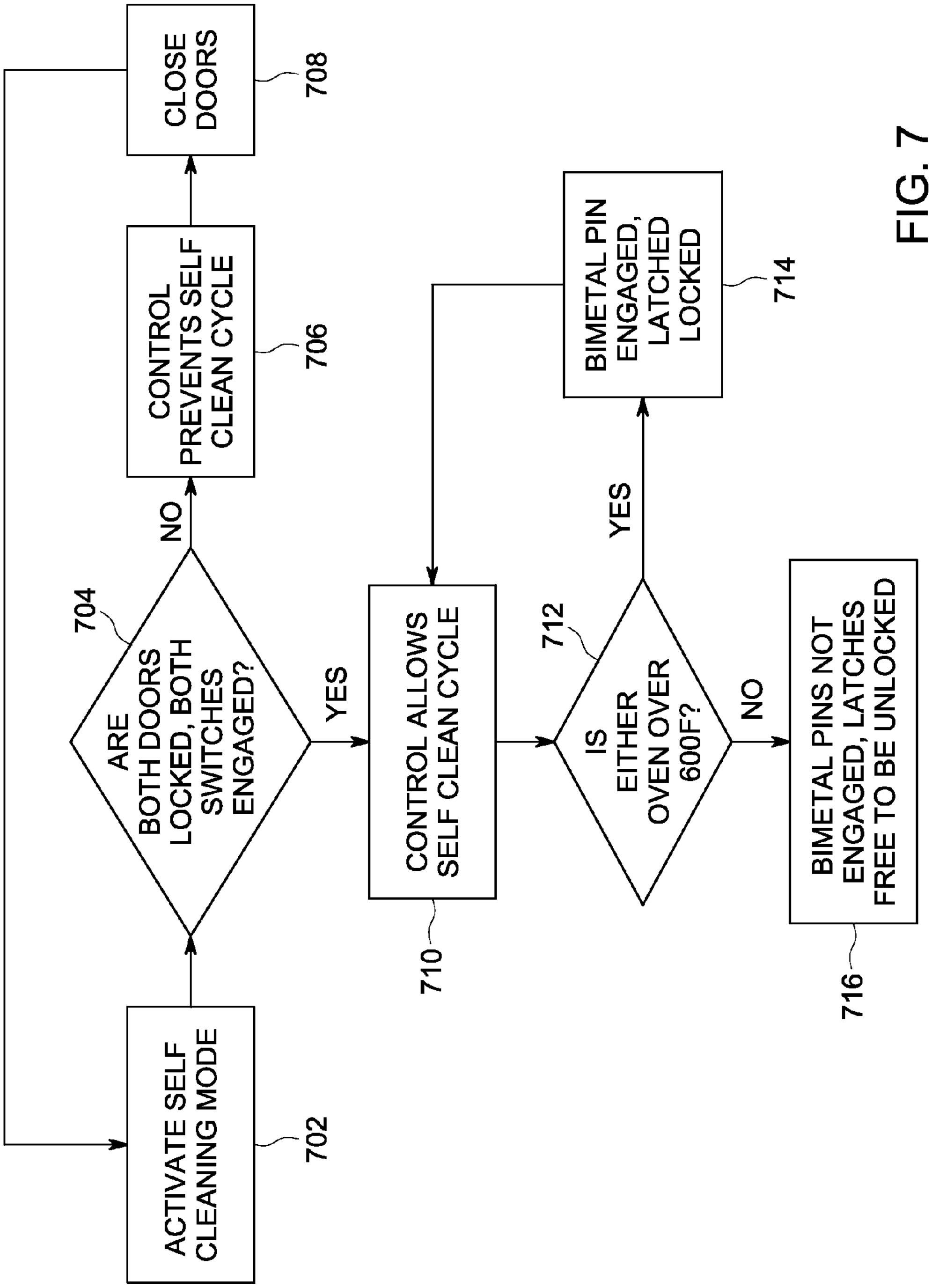
FIG. 7 is a flowchart illustrating a process according to an embodiment of the present disclosure.

FIG. 7 illustrates one example of a process incorporating aspects of the disclosed embodiments. In one embodiment, a self-cleaning mode or cycle of a multiple, or dual-cavity oven appliance is activated 702. Although the aspects of the disclosed embodiments are generally described herein with respect to a temperature-based self-cleaning operation or cycle, in alternate embodiments the locking mechanism can be applied during any suitable cleaning operation, such as for example, a steam cleaning operation. Generally, the aspects of the disclosed embodiments can be applied to any appliance where the locking of multiple doors is required.

A determination 704 is made as to whether each door in the multiple-cavity oven is closed and locked. In one embodiment, determination 704 comprises checking the status of each switch 317, 327. If each switch 317, 327 indicates that the respective door 62, 72 is closed and locked, the self-cleaning mode is enabled. If both doors 62, 72 are not closed and locked, the self-cleaning mode is disabled 706, or cannot be engaged. Once the oven doors 62, 72 are closed 708, the self-cleaning mode is activated 702. In one embodiment, if an oven door 62, 72 is not closed and locked, a suitable warning or indication can be provided. This can be in the form of a suitable aural or visual indication.

Once each of the oven doors is determined to be closed and locked, the self-cleaning cycle or mode is engaged 710. This results in the general increase in the selected oven's temperature, as is generally known in the art. A determination 712 is made as to the temperature of the oven cavity. As the temperature of the oven increases to approximately 600 degrees Fahrenheit, the temperature dependent locking device for the oven is activated 714. As long as a temperature of any one of the ovens reaches is over 600 degrees Fahrenheit, the temperature dependent locking device will remain activated 714. In this state, as long as one of the oven doors remains locked due to the temperature dependent locking device, the latches for each of the oven doors will not be enabled to be released or moved from the locked state. The cable connection between the master and slave latch will not enable one latch to be moved without corresponding movement of the other latch. Thus, if one latch is secured in place by the temperature dependent locking device, the other latch will not be able to be independently unlocked. Similarly, when one door is not in the fully closed position, the other door cannot be securely latched. When both latches are no longer secured by the temperature dependent locking device, each latch will be enabled to be unlocked 716.

Figure 8:
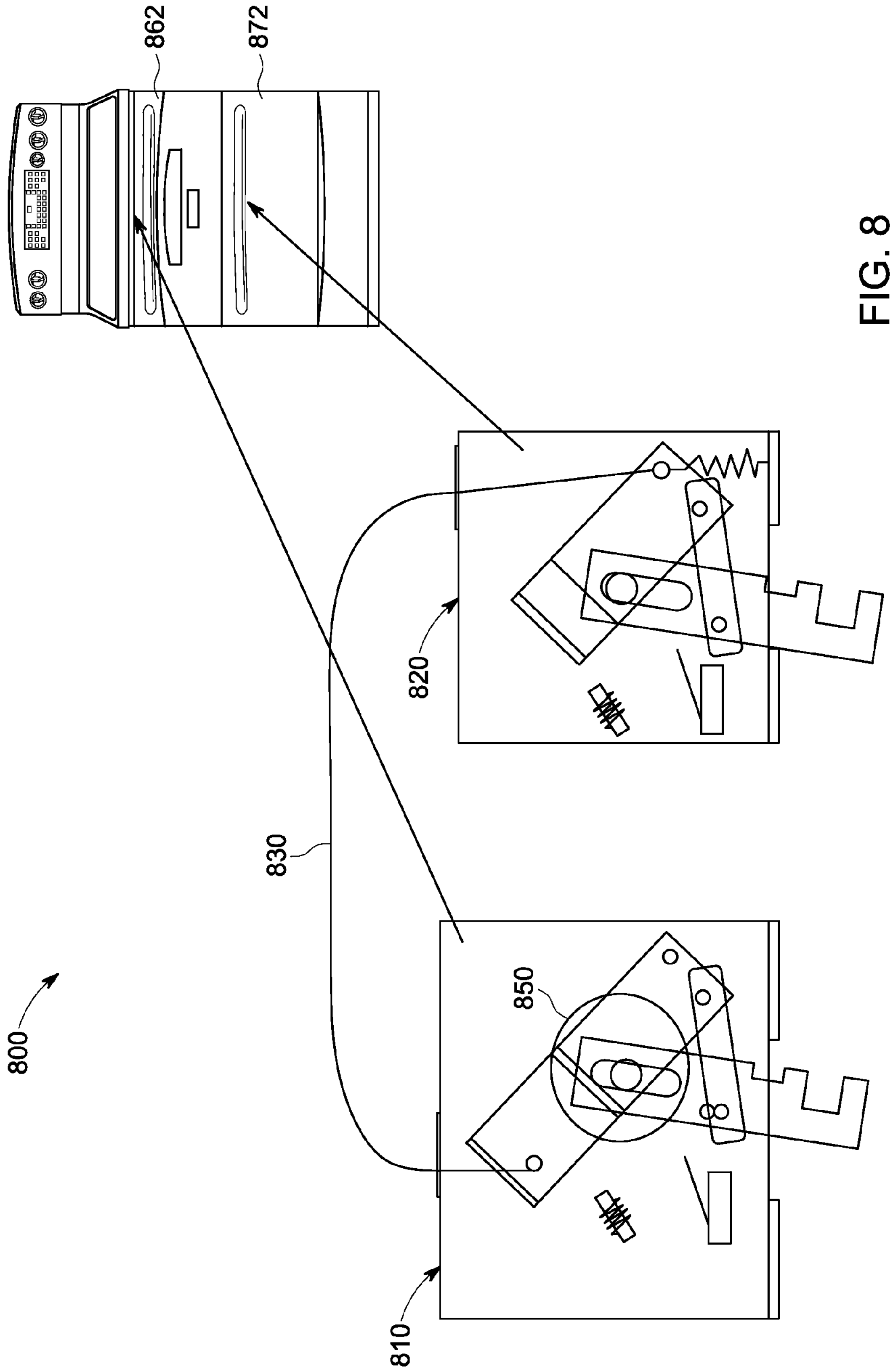
FIG. 8 is a top-down schematic view of a motor driven latch assembly incorporating aspects of the disclosed embodiments.

FIG. 8 illustrates an embodiment of a latching system 800 for an oven where a motorized locking mechanism 850 is utilized to drive the master latch assembly 810. In this embodiment, a master latch assembly or driving latch 810 is coupled to a sensing or slave latch assembly 820 by a cable 830. Operation of the latching assemblies 810 and 820 is similar to that described with respect to the assemblies shown in FIG. 3, except that instead of a handle member 311 to mechanically activate the locking, a motor 850 is used to drive the driving latch assembly 810 between the open and locked positions. The cable 830 will communicatively engage the sensing/slave latch assembly 820 and cause the latch assembly 820 to drive to the locked position in conjunction with the master latch assembly 810, as long as both doors 862, 872 are fully closed as is described herein.

In one embodiment, referring to FIG. 2, the oven 10 includes a controller 216. The controller 216 is configured to detect the activation of the switches 317 and 327 and enable a self-cleaning cycle when both switches 317, 327 are set to indicate that the oven doors 62, 72 are in the closed and locked position. The controller 216 can also be configured to be coupled to the display and user interface 218, receive inputs and commands from the controls 212*a*-212*e*, and control the various operations and functions of the oven 10.

The aspects of the disclosed embodiments utilize a mechanical cable to operatively couple two separate mechanical latching systems in a double oven appliance. One manual latch is used to control the locking of multiple oven doors and enable a self-cleaning cycle, where each oven door remains locked as long as one oven does not meet a predetermined temperature set point.

A driving or master latch is coupled to a similar sensing or slave latch. When the drive latch is activated, the cable will move the sensing latch a corresponding distance. Each latch cannot move to the fully locked position unless the respective door is in the fully closed position. The latch assemblies can include a position switch and a thermally driven locking mechanism that prevents either latch from being opened as long as the temperature of the corresponding oven is above a pre-determined temperature set point. When the sensed temperature drops below the predetermined temperature set point in each oven, both thermal-locking mechanisms will disengage and the master latch can be moved to the unlocked position. Movement of the master latch to the unlocked position will correspondingly move the slave latch to the unlocked position. The aspects of the disclosed embodiments allow a single latching mechanism to control the locking of both oven doors by verifying that both doors are in the fully closed position prior to locking and enabling the self clean cycle, and only allowing opening of either door as long as both thermal locks are no longer engaged. The aspects of the disclosed embodiments thus provide a lower cost mechanical control system that allows for remote activation of a mechanical latch system to lock multiple oven doors.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A latching system for an appliance comprising at least a first oven, a first door for the first oven, a second oven and a second door for the second oven, the latching system comprising:

- a master latch assembly for locking the first door when the first door is fully closed, the master latch assembly comprising a handle member and a latch pawl, wherein
  - a first end of the latch pawl including a first notch and a second notch, the second notch being disposed adjacent to the first notch, the first notch and the second notch both being of a shape allowing door engagement and open in the same direction, wherein if the first door is not fully closed, the handle member is prevented from being moved to the fully locked position by engagement of the first notch with the first door thereby preventing engagement of the second notch with the first door and thereby preventing locking of the first door, and
  - a second end of the latch pawl being pivotably coupled to the handle member;
- a slave latch assembly for locking the second door when the second door is fully closed, the slave latch assembly comprising a link member and a latch pawl, wherein
  - a first end of the latch pawl of the slave latch assembly including a first notch and a second notch, the second notch being disposed adjacent to the first notch, the first notch and the second notch both being of a shape allowing door engagement and open in the same direction, wherein if the second door is not fully closed, the handle member is prevented from being moved to the fully locked position by engagement of the first notch with the second door thereby preventing engagement of the second notch with the second door and thereby preventing locking of the second door, and
  - a second end of the latch pawl of the slave latch assembly being pivotably coupled to the link member;
- a cable operatively coupling the master latch assembly and the slave latch assembly so that a movement of the master latch assembly between an unlocking position where the first door is unlocked and a locking position where the first door is locked generates a corresponding movement of the slave latch assembly between an unlocking position where the second door is unlocked and a locking position where the second door is locked;
- a position switch associated with one of the master latch assembly and the slave latch assembly and configured to detect when the one of the master latch assembly and the slave latch assembly is in its locking position; and
- a controller coupled to the position switch and configured to enable an operational mode of at least one of the first oven and the second oven when the position switch detects the one of the master latch assembly and the slave latch assembly is in its locking position in conjunction with a request for the operational mode.

2. The latching system of claim 1, wherein if one of the first door and the second door is not fully closed, the respective locking position is not achieved and the position switch is not activated.

3. The latching system of claim 2, further comprising a second position switch associated with an other of the master latch assembly and the slave latch assembly and configured to detect when the other of the master latch assembly and the slave latch assembly is in its locking position.

4. The latching system of claim 1, further comprising a first temperature-dependent locking device associated with the master latch assembly, and a second temperature-dependent locking device associated with the slave latch assembly, the first temperature-dependent locking device being configured to activate when a temperature of the first oven exceeds a pre-determined temperature set point and the second temperature-dependent locking device being configured to activate when a temperature of the second oven exceeds a predetermined temperature set point.

5. The latching system of claim 4, wherein the first temperature-dependent locking device is configured to maintain the master latch assembly in its locking position when the first temperature-dependent locking device is activated and the second temperature-dependent locking device is configured to maintain the slave latch assembly in its locking position when the second-temperature-dependent locking device is activated.

6. The latching system of claim 5, wherein each of the master latch assembly and the slave latch assembly remains in its locking position when at least one of the first temperature-dependent locking device and the second temperature-dependent locking device is activated.

7. The latching system of claim 1, wherein the master latch assembly comprises a manually activated latch assembly.

8. The latching system of claim 1, wherein the master latch assembly comprises a motor driven latch assembly.

9. The latching system of claim 1, wherein the handle member is configured for moving the master latch assembly between the unlocking position and the locking position.

10. The latching system of claim 1, wherein the appliance is a dual-cavity oven appliance, and the operational mode is a self-cleaning mode.

11. An appliance comprising:

a first oven;

a first door for the first oven;

a second oven;

a second door for the second oven;

a master latch assembly for locking the first door when the first door is fully closed, the master latch assembly comprising a handle member and a latch pawl, wherein a first end of the latch pawl including a first notch and a second notch, the first notch and the second notch both being of a shape allowing door engagement and open in the same direction, wherein if the first door is not fully closed, the handle member is prevented from being moved to the fully locked position by engagement of the first notch with the first door thereby preventing engagement of the second notch with the first door and thereby preventing locking of the first door, and a second end of the latch pawl being pivotably coupled to the handle member;

a slave latch assembly for locking the second door when the second door is fully closed, the slave latch assembly comprising a link member and a latch pawl, wherein a first end of the latch pawl of the slave latch assembly including a first notch and a second notch, the second notch being disposed adjacent to the first notch, the first notch and the second notch both being of a shape allowing door engagement and open in the same direction, wherein if the second door is not fully closed, the handle member is prevented from being moved to the fully locked position by engagement of the first notch with the second door thereby preventing engagement of the second notch with the second door and thereby preventing a locking of the second door, and a second end of the latch pawl of the slave latch assembly being pivotably coupled to the link member;

a cable operatively coupling the master latch assembly and the slave latch assembly so that a movement of the master latch assembly between an unlocking position wherein the first door is unlocked and a locking position where the first door is locked generates a corresponding movement of the slave latch assembly between an unlocking position wherein the second door is unlocked and a locking position where the second door is locked;

a position switch associated with one of the master latch assembly and the slave latch assembly and configured to detect when the one of the master latch assembly and the slave latch assembly is in its locking position; and a controller coupled to the position switch and configured to enable an operational mode of at least one of the first oven and the second oven when the position switch detects the one of the master latch assembly and the slave latch assembly is in its locking position in conjunction with a request for the operational mode.

12. The latching system of claim 1, wherein the first notch of the master latch assembly engages a portion of the first door when the first door is in a fully closed position and the first notch of the slave latch assembly engages a portion of the second door when the second door is in a fully closed position.

13. The latching system of claim 12, wherein the second notch of the master latch assembly engages the portion of the first door when the first door is in a partially closed position and the second notch of the slave latch assembly engages the portion of the second door when the second door is in a partially closed position.

* * * * *